United States Patent [19]

Nonaka et al.

[11] Patent Number: 5,536,379
[45] Date of Patent: Jul. 16, 1996

[54] GAS DIFFUSION ELECTRODE

[75] Inventors: Tsutomu Nonaka; Takahiro Ashida; Shuhei Wakita, all of Kanagawa; Takayuki Shimamune, Tokyo; Yoshinori Nishiki, Kanagawa, all of Japan

[73] Assignee: Permelec Electrode, Kanagawa, Japan

[21] Appl. No.: 416,366

[22] Filed: Apr. 4, 1995

[30] Foreign Application Priority Data

Apr. 6, 1994 [JP] Japan .................................. 6-093654

[51] Int. Cl.⁶ .................................................. C25B 11/00
[52] U.S. Cl. ........................ 204/284; 204/290 R; 429/40; 429/42
[58] Field of Search ................. 204/283, 290 R, 204/284; 429/42, 40

[56] References Cited

U.S. PATENT DOCUMENTS

| 4,927,514 | 5/1990 | Solomon et al. | 204/290 R |
| 4,980,037 | 12/1990 | Hossain et al. | 204/290 R |
| 5,300,206 | 4/1994 | Allen et al. | 204/290 R |

Primary Examiner—John Niebling
Assistant Examiner—Kishor Mayekar
Attorney, Agent, or Firm—Sughrue, Mion, Zinn, Macpeak & Seas

[57] ABSTRACT

A gas diffusion electrode comprising a water permeable gas diffusion and reaction layer and a porous and electrically conductive electrode current collector having a water repellency bonded to the gas diffusion and reaction layer.

5 Claims, 1 Drawing Sheet

GAS DIFFUSION ELECTRODE

FIELD OF THE INVENTION

The present invention relates to a gas diffusion electrode for use in an industrial electrolytic field and more specifically to a gas diffusion electrode having a sufficient durability and capable of saving energy.

BACKGROUND OF THE INVENTION

A gas diffusion electrode easily supplies a gas as a reaction material to the surface of the electrode and has been developed essentially for alkali phosphate type fuel cells, etc., [see; H. Wendt (Elsevier), *Electrochemical Hydrogen Technologies*, pages 373 et seq.]. Recently, in particular, solid polymeric electrolyte type fuel cells have been actively investigated again and an output of larger than 1 A/dm$^2$ becomes possible [see, E. A. Ticianelli et al, *J. Electroanal. Chem.*, 251, 275(1988)].

On the other hand, there has been recent investigation of these gas diffusion electrodes for industrial electrolyses. For example, in the production apparatus for hydrogen peroxide on site, the operation is carried out using a water repellent porous cathode for carrying out the oxygen reduction reaction, as described in D. Pletcher, et al., *Industrial Electrochemistry*. (2nd Edition), pages 279 et seq., published by Chapman & Hall. Also, in alkali production and recovery, the oxygen generation at an anode as a counter electrode reaction, the hydrogen oxidation at an anode in place of the hydrogen generation at a cathode [J. Joerissen et al., *J. Applied Electrochem.*, 21, pages 869~(1991)], or the oxygen reduction at a cathode [Miura, et al., *J. of the Chemical Society of Japan*, 732(1982)] is carried out using a gas diffusion electrode. As a result, the electric power consumed can be reduced. Furthermore, in recovery processes such as the recovery of zinc, etc., and zinc plating, good results are obtained by using a hydrogen anode as a counter electrode [Denki Kagaku oyobi Kogyo Buturikagaku (Electrochemistry and Industrial Physical Chemistry), 56, pages 653 et seq. (1988)].

When a conventional gas diffusion electrode for a fuel cell is used as the gas diffusion electrode in these industrial electrolyses, since the composition of the solution is not simple, unlike the case of a fuel cell, there is the problem that the life of the gas diffusion electrode is liable to be influenced.

A conventional gas diffusion electrode generally has three layers, i.e., a uniform water repellent layer for completely separating a gas from a liquid, an electrically conductive porous layer (metal mesh) for supplying an electric current, and a fine reaction layer having a catalyst. However, when the gas diffusion electrode is used as an oxygen cathode for the electrolysis of sodium chloride, a chlorate ion which is an oxidation product formed at the anode or a hydrogen peroxide ion formed as an intermediate seed by the cathodic reaction chemically acts to the catalyst-carrying powder and/or the water repellent material to separate the foregoing three layers from each other. As a result, the gas-liquid separation ability is sometimes lowered, increasing the electrolytic voltage or causing hydrogen generating reaction.

Also, in this case, if a carbon dioxide gas is intermixed in the supplied electrolyte or gas, it sometimes happens that the carbon dioxide reacts with an alkali to form a carbonate, which deposits as precipitates to clogg the electrode.

SUMMARY OF THE INVENTION

An object of the present invention is to solve the problems in the conventional techniques described above and to provide a gas diffusion electrode which is stable over a long period of time and can be easily large-sized in the case of industrial electrolysis.

This and other objects of the present invention are achieved by a gas diffusion electrode comprising a water permeable gas diffusion and reaction layer and a porous electrically conductive electrode current collector having a water repellency bonded to the gas diffusion and reaction layer.

DETAILED DESCRIPTION OF THE INVENTION

Figure 1:
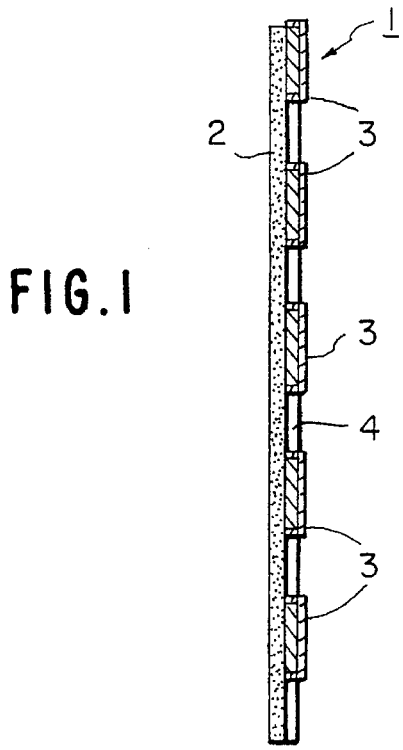
FIG. 1 is a schematic vertical sectional view showing one embodiment of the gas diffusion electrode of the present invention.

The present invention is described in detail.

As described above, in a conventional gas diffusion electrode wherein a water repellent layer functions as a complete separator of an electrolyte solution and a supplied gas, when the electrolysis is performed over a long period of time, the three layers are separated from each other to lose the water repellency, whereby the gas-liquid supplying and removing ability gradually deteriorates and the continuation of the electrolysis becomes impossible. This tendency is particularly remarkable with a corrosive liquid.

In the present invention, the method of bonding several layers is not employed to prevent peeling of each layer as occurred in conventional gas diffusion electrodes, and the water permeable gas diffusion and reaction layer is bonded to the porous and electrically conductive electrode current collector having a water repellency to integrate those in a body.

The gas diffusion and reaction layer used in the present invention is a layer having both the functions of a gas diffusion layer and a reaction layer in a conventional gas diffusion electrode. A hydrophilic portion and a hydrophobic portion exist together in the layer. The gas diffusion and reaction layer is disposed in an electrolytic cell at the side which is contacted with an electrolyte. It has the function of permeating the electrolyte and reacting with the gas from the water repellent layer, and also has an electric conductivity and a corrosion resistance.

The gas diffusion and reaction layer can be prepared by mixing and kneading a powder selected from, for example, a fluorinated pitch powder, a fluorinated graphite powder, a carbon powder, a graphite powder, a nickel powder, a silver powder, etc.; an aqueous suspension of a fluorine resin, a lubricant (e.g., naphtha, etc.), a surface active agent (e.g., Triton (trade name, made by Rohm & Haas Co.), etc.), etc., to obtain a uniform pasty mixture, coating the mixture on fiber cloth of carbon fibers, metal fibers, etc., which is the water permeable core material, drying the coated cloth at, for example, about 60° C. for about 30 minutes, and burning it at about 250° C. for about 30 minutes to remove the surface active agent. In addition, in this case, the powder only can be formed into a sheet form without using the core material described above.

It is preferred that the powder is carried on a noble metal such as platinum, gold, palladium, etc., the oxides of the noble metals; a complex of cobalt, iron, etc.; a spinel of nickel, lanthanum, etc.; perovskite; or a rutile-type or pyrochlore-type oxide of ruthenium, lead, etc., as a catalyst component.

The powder can be provided on the catalyst component by previously mixing the catalyst powder with a mixture of the powder when kneading the mixture, coating a solution of the salt of the catalyst metal on the surface of the powder followed by burning to deposit the catalyst metal, or electrolessly plating a solution of the catalyst metal salt on the surface of the powder using a reducing agent.

On the other hand, the electrode current collector having a water repellent layer bonded to the gas diffusion and reaction layer is porous and easily discharges the liquid permeated from the gas diffusion and reaction layer to the back surface thereof, and the gas supplied from the electrode current collector side can easily reach the gas diffusion and reaction layer by the strong water repellency of the water repellent layer. That is, since the liquid separation is good at the surface of the repellent layer due to the water repellency and thus the liquid does not substantially exist at the surface of the water repellent layer, the supply of the gas is not prevented.

The electrode current collector is preferably composed of mesh, expanded mesh, foamed material, or sintered powder of titanium, nickel, stainless steel, etc., or a composite material thereof and a water repellent layer containing a water repellent material such as a fluorine resin, etc., is formed on the surface thereof to impart a water repellency to the electrode current collector. It is preferred that the water repellent layer is formed at a thickness of from about 1.0 to 100 μm by coating or providing a non-porous (i.e., liquid impermeable) material composed of the fluorine resin and an electrically conductive powder such as a nickel powder, a carbon powder, etc. Also, when the electrode current collector is a mesh, it is preferred that the porosity thereof is from 30 to 90%, the thickness is from 0.1 to 0.5 mm, and the size of the mesh is from 10 to 200 mesh.

After coating the water repellent material described above on the surface of the electrode current collector, the coated layer is dried at about 60° C. and burned at 350° C. to form a water repellent layer, whereby the electrode current collector is obtained. Or, a water repellent treatment may be applied to the surface of the mesh, the expanded mesh, the expanded material, or the sintered powder described above by dispersion plating. Furthermore, a thermally stable powder such as a fluorine carbon powder, etc., may be coated on the surface of the above material together with a metal paste or a composition which imparts an electric conductivity by a thermal decomposition followed by baking.

For integrating the gas diffusion and reaction layer and the electrode current collector described above into a body, both members are superposed to each other, they are pressed by applying a pressure of from about 30 to 300° to form preferably under heating, and the assembly is then sintered, for example, at a temperature of from about 330 to 370° C. for about 30 minutes to strongly bond the gas diffusion and reaction layer to the electrode current collector such that they do not separate from each other. If necessary, bonding of them may be further increased by using a binder such as a fluorine resin, etc.

Moreover, for preparing the electrode current collector having a greatly improved water repellency, it is desirable that a fine powder of a water repellent material such as a fluorine resin, fluorinated graphite, etc., is dispersed in a plating bath such as a nickel plating bath, etc., and the gas diffusion and reaction layer and the porous electrode current collector are partially integrated by dispersion plating.

In the gas diffusion electrode of the present invention thus prepared, the number of constituent elements is less than that of a conventional gas diffusion electrode, whereby the structure itself is simplified. The gas diffusion electrode can be used as the electrode for various industrial electrolyses. For example, when the electrode is used for alkali electrolysis such as sodium chloride electrolysis, etc., the gas diffusion electrode is disposed in the cathode chamber of an electrolytic cell which is partitioned into the anode chamber and the cathode chamber by an ion-exchange membrane at a certain distance from the ion-exchange membrane such that the gas diffusion and reaction layer of the gas diffusion electrode faces the ion-exchange membrane and electrolysis is carried out by passing an electric current through both the electrodes while supplying an oxygen gas to the electrode current collector side. The anode can be a zero gap type electrode closely adhered to the ion-exchange membrane for reducing the voltage.

By electrolysis, an alkali hydroxide is formed in the cathode chamber as in the case of an ordinary alkali electrolysis, and since hydrogen formed in the cathode reacts with oxygen supplied to form water, the energy required for forming hydrogen can be saved.

In electrolysis using the gas diffusion electrode of the present invention, since the electrode current collector is porous, the gas diffusion and reaction layer and the electrode current collector are integrated in a body and the current collector has a pore portion. On the other hand, the electrolyte discharged to the back surface of the electrode current collector is sufficiently separated from the gas component and thus can be easily recovered at the lower portion of the electrolytic cell. Accordingly, even when the gas diffusion electrode is used under severe conditions such as sodium chloride electrolysis, layer separation rarely occurs which is different from the conventional cases, and the electrolysis can be stably operated over a long period of time.

The gas diffusion electrode of the present invention and an example of applying the gas diffusion electrode to a sodium chloride electrolysis are explained based on the accompanying drawings.

Figure 2:
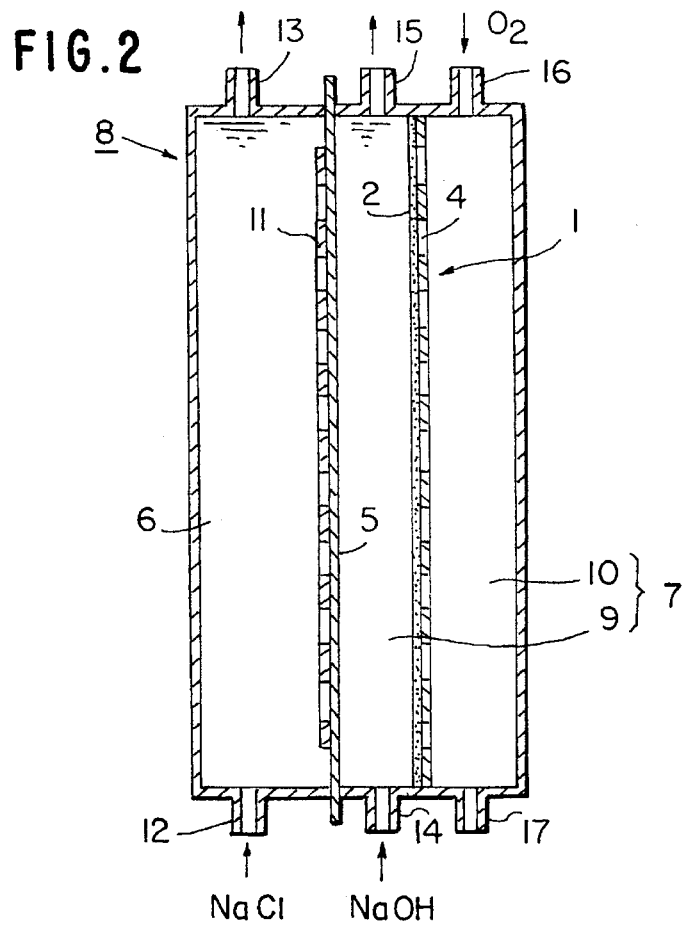
FIG. 2 is a schematic vertical sectional view showing one example of a sodium chloride electrolytic cell having incorporated therein the gas diffusion electrode shown in FIG. 1 as the cathode.

FIG. 1 is a schematic vertical sectional view showing one embodiment of the gas diffusion electrode of the present invention, and FIG. 2 is a schematic view showing one example of a sodium chloride electrolysis having incorporated therein the gas diffusion electrode of FIG. 1.

The gas diffusion electrode 1 is prepared by pressing a sheet-form gas diffusion and reaction layer 2 formed by kneading a carbon powder carrying a catalyst such as platinum, silver, etc., and a powder of a fluorine resin such as polytetrafluoroethylene (hereinafter referred to as "PTFE") and an electrode current collector 4 formed by applying a water repellent layer 3 of a water repellent material such as a fluorine resin, etc., onto the surface of a porous metal substrate by a hot press, etc.

The gas diffusion electrode 1 is disposed in the cathode chamber 7 of an electrolytic cell 8 partitioned into an anode chamber 6 and a cathode chamber 7 by an ion-exchange membrane 5 with a certain distance from the ion-exchange membrane 5 as shown in FIG. 2. The cathode chamber 7 is partitioned into a solution chamber 9 at the side of the ionexchange membrane 5 and a gas chamber 10 at the opposite side.

The numeral 11 identifies a porous anode in contact with the ion-exchange membrane 5 in the anode chamber side, the numerals 12 and 13 identify an inlet and an outlet, respectively, of an anolyte formed at the lower portion and the upper portion of the anodic chamber 6, the numerals 14 and 15 identify an inlet and an outlet, respectively, of a catholyte formed at the lower portion and the upper portion of the solution chamber 9, and the numerals 16 and 17 identify an inlet and an outlet, respectively, of an oxygen gas formed at the upper portion and the lower portion of the gas chamber 10.

When an electric current is passed through both the electrodes while supplying a saturated aqueous sodium chloride solution to the anode chamber 6 of the electrolytic cell LO composed of such a construction through the anolyte inlet 12, a dilute aqueous sodium hydroxide solution to the solution chamber 9 of the cathode chamber 7 through the catholyte inlet 14, and an oxygen gas or air to the gas chamber 10 of the cathode chamber 7 through the oxygen gas inlet 16, the sodium ion reaches the solution chamber 9 from the anode chamber 6 through the ion-exchange membrane 5 and combines with the hydroxy ion formed in the solution chamber 9 to form sodium hydroxide. Also, at the same time, the hydroxide ion formed in the gas diffusion and reaction layer of the gas diffusion electrode (cathode) 1 diffuses toward the electrode current collector 4, and a part of the water molecules transferred through the ion-exchange membrane 5 is discharged through the porous electrode current collector 4 to the back surface thereof. In this case, since a liquid does not exist at or near the back surface of the electrode current collector 4 due to the existence of the water repellent layer 3, the supply of oxygen gas or air is accelerated, whereby the electrolytic voltage can be effectively reduced.

The following examples are intended to illustrate instances in which the gas diffusion electrode of the present invention is applied to sodium chloride hydrolysis but not to limit the invention in any way.

EXAMPLE 1

For forming the gas diffusion and reaction layer, a carbon powder (XC-72) carrying 20% by weight of silver, a PTFE aqueous suspension (30J, trade name, made by Mitsui Fluorochemical Company, Ltd.), and naphtha as a solvent were kneaded to obtain a clayish material. The material was coated on both the surfaces of Celmet (trade name, made by Sumitomo Electric Industries, Ltd.) followed by drying. The coated layers were then heated to 250° C. for 15 minutes to remove the surface active agent contained in the aqueous suspension. The carried amount of silver was 100 g/m$^2$.

For forming the electrode current collector, a mixture of an aqueous suspension of a PTFE powder, a graphite powder (TGP-2, trade name, made by Tokai Carbon Co., Ltd.), and a naphtha solvent was coated on the surface of a nickel-made expanded mesh (porosity 50%, thickness 0.2 mm, short diameter 3 mm, long diameter 5 mm) followed by drying and the coated layer was treated at 250° C. for 15 minutes to remove the surface active agent and the naphtha solvent.

The Celmet described above was superposed on the expanded mesh, and they were integrated in a body by pressing them at a pressure of 300 kg/m$^2$ for 5 minutes. The integrated assembly was burned for one hour at 370° C. to strengthen the fixing of PTFE to obtain a gas diffusion cathode.

As the anode, a titanium mesh electrode carrying a catalyst (carried about 5 g/m$^2$) composed of oxides of ruthenium and iridium (1:1 by molar ratio) was used.

As a cation-exchange membrane, Nafion 961 (trade name, made by E. I. Du Pont de Nemours and Company) was used, the membrane was combined with the above anode as a zero gap type, and the above cathode was disposed at the position of 2 mm away from the cation-exchange membrane to constitute an electrolytic cell.

Two hundred g/liter of aqueous sodium chloride solution was supplied from the lower portion of the electrolytic cell as an anolyte, a 30wt % aqueous solution of sodium hydroxide was supplied from the lower portion of the electrolytic cell as a catholyte while keeping each solution at 80° C., and electrolysis was carried out at a current density of 30 A/dm$^2$.

In this case, even after 3,000 hours after initiation of the electrolysis, the electrolysis could be stably continued at a cell voltage of 2.3 volts.

COMPARATIVE EXAMPLE 1

When the electrolysis of an aqueous sodium chloride solution was carried out in the same manner as in Example 1 except that a commercially available gas diffusion electrode was used as the cathode, after 2,000 hours, the layers of the electrode were peeled and the cell voltage was raised.

EXAMPLE 2

A laminate prepared by superposing the silver-carried Celmet prepared in the same manner as in Example 1 on the nickel mesh without being subjected to a water repellent treatment as used in Example 1 and integrating them in a body by applying them a pressure was used as a cathode and the cathode was set in a nickel electrodeposition bath in which PTFE particles having a particle size of 0.5 μm were suspended. In the electrodeposition bath was disposed a nickel plate as an anode facing the nickel mesh, and electrodeposition was carried out for 30 minutes at a current density of 1 A/dm$^2$ to form a super water repellent coating 50 μm thick on a part of the nickel mesh and a part of the Celmet.

When the electrolysis test was carried out as in Example 1 using the laminate of the nickel mesh and the Celmet as the cathode, even after 6,000 hours, the cell voltage was kept at 2.3 volts.

As described above, the present invention is a gas diffusion electrode comprising a water permeable gas diffusion and reaction layer and a porous and electrically conductive electrode current collector having a water repellency press-bonded to the gas diffusion and reaction layer.

The gas diffusion electrode is different from a conventional electrode composed of three press-bonded members of a gas diffusion layer, a reaction layer, and an electrode current collector. In the gas diffusion electrode of the present invention, the functions of the gas diffusion layer and the reaction layer in the conventional gas diffusion electrode are performed by the gas diffusion and reaction layer, and a water repellent layer is formed on the surface of the electrode current collector such that a liquid does not substantially exist at the surface of the electrode current collector.

That is, in the gas diffusion electrode of the present invention, the constituent elements of the gas diffusion electrode are reduced from three members in a conventional gas diffusion electrode to two members. Accordingly, the structure of the electrode itself is simplified, the gas diffusion and reaction layer and the electrode current collector are integrated in a body, and the current collector has pores. Thus, even when the gas diffusion electrode is used under a severe conditions such as sodium chloride electrolysis, layer peeling as in the conventional case rarely occurs and the gas diffusion electrode makes it possible to stably operate electrolysis over a long period of time.

While the invention has been described in detail and with reference to specific embodiments thereof, it will be apparent to one skilled in the art that various changes and modifications can be made therein without departing from the spirit and scope thereof.

What is claimed is:

1. A gas diffusion electrode comprising a water permeable gas diffusion and reaction layer and a porous and electrically conductive electrode current collector having a water repellency bonded to the gas diffusion and reaction layer.

2. The gas diffusion electrode as claimed in claim 1, wherein the gas diffusion and reaction layer and the electrode current collector are partially integrated in a body by dispersion plating using a dispersion of a fine powder of a fluorine resin or a fluorized graphite.

3. The gas diffusion electrode as claimed in claim 1, wherein the gas diffusion and reaction layer and the electrode current collector are integrated in a body by partially fixing thereto a fine powder of a metal or fluorinated carbon using a fluorine resin.

4. The gas diffusion electrode as claimed in claim 1, wherein the electrode current collector is composed of mesh, expanded mesh, foamed material, sintered material of titanium, nickel, stainless steel, or a composite thereof.

5. The gas diffusion electrode as claimed in claim 1, wherein the electrode current collector is composed of mesh which is 10 to 200 mesh, has a porosity of 30 to 90%, and has a thickness of 0.1 to 0.5 mm.

* * * * *